(12) United States Patent
Li et al.

(10) Patent No.: US 8,000,556 B2
(45) Date of Patent: Aug. 16, 2011

(54) METHOD FOR ESTIMATING NOISE ACCORDING TO MULTIRESOLUTION MODEL

(75) Inventors: Jian-Feng Li, Hangzhou (CN); Cheng-Jian He, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 597 days.

(21) Appl. No.: 12/153,192

(22) Filed: May 15, 2008

(65) Prior Publication Data

US 2009/0285504 A1    Nov. 19, 2009

(51) Int. Cl.
*G06K 9/40* (2006.01)
(52) U.S. Cl. .................................................. 382/275
(58) Field of Classification Search .................. 382/254, 382/255, 274–275
See application file for complete search history.

(56) References Cited

U.S. PATENT DOCUMENTS

| 6,933,983 B2 * | 8/2005 | Wredenhagen et al. ...... 348/618 |
| 7,319,494 B2 * | 1/2008 | Wredenhagen et al. ...... 348/606 |
| 7,373,011 B2 * | 5/2008 | Saquib .......................... 382/255 |
| 2007/0223582 A1 * | 9/2007 | Borer ....................... 375/240.12 |

* cited by examiner

*Primary Examiner* — Jingge Wu
(74) *Attorney, Agent, or Firm* — Bacon & Thomas, PLLC (57) ABSTRACT

A method for estimating noise according to a multiresolution model is applied to an imaging device and comprises steps of: using an imaging sensor of the imaging device to capture a series of images of a scene under different imaging conditions; processing the images with a multiresolution transformation process to obtain a series of sub-images corresponding to different frequency layers; processing a series of the sub-images of the images that are in a same frequency layer to generate an averaged image; determining a difference between each of the sub-images in the same frequency layer and the averaged image corresponding to that frequency layer, and calculating the differences and the averaged image to obtain noise level functions of the imaging sensor in the different frequency layers under the different imaging conditions; and defining the noise level functions of the imaging sensor as noise samples for establishing an a priori model database.

15 Claims, 7 Drawing Sheets

METHOD FOR ESTIMATING NOISE ACCORDING TO MULTIRESOLUTION MODEL

FIELD OF THE INVENTION

The present invention relates to a method for estimating noise, and more particularly to a method for estimating noise according to a multiresolution model, wherein the method is carried out by actually detecting noise level functions (NLFs) of an imaging sensor (such as a CMOS sensor or a CCD sensor) in different frequency layers under different imaging conditions, and the noise level functions are defined as noise samples for building up an a priori model database, so that an imaging device (such as a cell phone or a digital camera having an image capturer) having the imaging sensor can precisely estimate noise of digital images formed thereby according to the a priori model, while the estimated noise levels are further used to guide subsequent image processing procedures (such as noise removal, image enhancement, feature extraction, etc.), particularly the tune of specific parameters.

BACKGROUND OF THE INVENTION

Recently, with continuous development of digital image industry, various digital imaging devices (such as a digital camera, digital camcorder, notebook computer, cell phone, etc.) provided with a digital imaging sensor (such as a CCD or CMOS sensor) are rapidly developed and improved. There has been a trend to enhance image quality of the digital imaging devices, minimize the volume thereof, and lower the selling price thereof. Therefore, the digital imaging devices are more and more popular in the market. Nowadays, although many digital imaging devices provide such advanced functions as auto-focusing and auto-exposure, noise in digital images is inevitably generated while the digital images are being formed by the digital imaging devices. To solve this problem, the digital imaging devices must estimate the noise level of to-be-processed digital images, so as to generate noise level functions for guiding subsequent image processing procedures (such as noise removal, image enhancement, feature extraction, etc.), particularly the tune of specific parameters. Hence, it is important for a digital imaging device to precisely estimate the noise level of a digital image before executing subsequent image processing procedures.

Generally, a digital image formed by a digital imaging device, such as a digital photograph, has a noise level or a noise variance which varies with pixel intensity, wherein the noise level can be defined as a function of the pixel intensity, also known as a noise level function (NLFs). Thus, a noise estimation process executed by a digital imaging device is to estimate the noise level function of a digital image, in order to tune specific parameters of the digital imaging device.

With the development of digital image processing technologies, an innovative technology called "Multiresolution analysis" provides more better choices to enhance imaging quality of a digital imaging device. The multiresolution analysis includes a multiresolution transformation; such as wavelet transform, image pyramid, etc. The principle of multiresolution analysis is to disintegrate a digital image into a series of sub-images according to frequency layers of the digital image, so that each of the sub-images corresponds to information of a certain frequency layer of the digital image. Thus, when the digital imaging device executes various subsequent processing on the digital image formed by the digital imaging device, the processes can be performed on the sub-images of the different frequency layers. The multiresolution analysis is advantageous in increasing the flexibility and precision of the various subsequent processes (such as noise removal, motion estimation, feature extraction, etc.), and providing more room for development in enhancing the imaging quality of the digital imaging device.

Therefore, it is important for designers and manufacturers of various imaging devices to develop a method for estimating noise according to a multiresolution model, so that when an imaging device performs noise estimation on a digital image formed thereby, the noise estimation is performed on a sub-image in each of different frequency layers of a current digital image formed by the imaging device according to noise level functions of an imaging sensor of the imaging device in the different frequency layers under different imaging conditions, so as to obtain an optimized noise estimation result of the sub-image in each of the different frequency layers of the current digital image, thereby completely showing a noise distribution of the current digital image according to the multiresolution model, and effectively enhancing the efficiency and precision of noise estimation of the imaging device.

Therefore, in order to solve the problem that the traditional imaging device cannot precisely and efficiently estimate a noise level of a digital image, the present inventor after persistent research finally succeeded in developing a method for estimating noise according to a multiresolution model, so that an imaging device using the method of the present invention can precisely and efficiently estimate noise level functions of sub-images in different frequency layers of a digital image when the digital image is being formed by the imaging device.

SUMMARY OF THE INVENTION

A primary object of the present invention is to provide a method for estimating noise according to a multiresolution model, which method is applied to an imaging device (such as a cell phone or a digital camera having an image capturer), and comprises the following steps. An imaging sensor (such as a CMOS sensor or a CCD sensor) of the imaging device is used to capture a series of images of a specific scene (such as a color palette with intensity level) under a particular imaging condition (i.e., by selecting a fixed illuminating environment and a set of fixed device parameters). Then, each of the images is processed by a multiresolution transformation, so as to obtain a series of sub-images corresponding to different frequency layers. After that, a series of the sub-images of the different images which are in a same frequency layer are processed, so as to generate an averaged image defined as an actually noiseless sub-image sample in that particular frequency layer. Then, a difference between each of the sub-images in the same frequency layer and the averaged image corresponding to that particular frequency layer is calculated according to the averaged image. Furthermore, the difference (representing noise) and the averaged image (representing an intensity of a noiseless image) are calculated to generate a noise variance or a noise level function of each said sub-image corresponding to different intensity levels, so as to obtain noise level functions of the imaging sensor in the different frequency layers under that particular imaging condition. The foregoing steps are repeated after the imaging condition is adjusted, so as to obtain noise level functions in the different frequency layers under another imaging condition. Therefore, after capturing a large number of images under different imaging conditions to obtain noise level functions of the imaging sensor in the different frequency layers under the different imaging conditions, the noise level functions are defined as noise samples for building up an a priori model database. Thus, when the imaging device captures a current image and processes the current image with a multi-resolution transformation to obtain noise characteristics (such as a variance or standard deviation) of the sub-image in each of the different frequency layers of the current image corresponding to the different intensity levels, the imaging device can estimate noise in each of the different frequency layers of the current image. Furthermore, during the noise estimation, an optimization process is executed according to the noise characteristics of each of the sub-images corresponding to the image intensity levels, the a priori model database, and a noise estimation result for a previous frequency layer, so as to obtain an optimized noise estimation result in each of the different frequency layers of the current image. Finally, the optimized noise estimation results in all the different frequency layers are combined to completely show a noise distribution of the current image according to the multiresolution model (such as an image pyramid model).

A secondary object of the present invention is to provide the aforementioned method for estimating noise according to the multiresolution model, wherein the optimized noise estimation results can effectively enhance the precision and efficiency of the imaging device in estimating noise of a current image, and the noise level functions can be used to guide subsequent image processing procedures (such as noise removal, image enhancement, feature extraction, etc.), particularly the tune of specific parameters.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
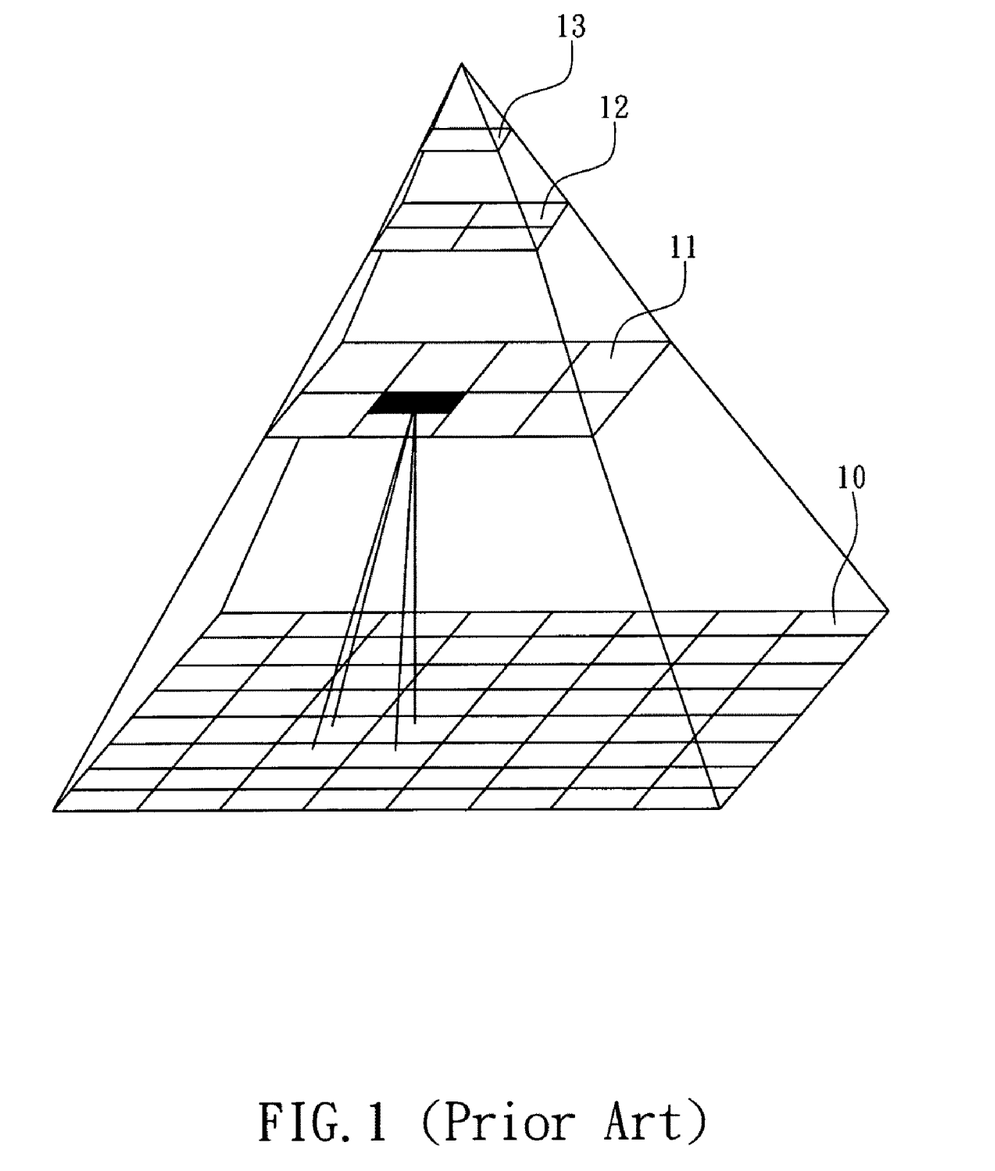
FIG. 1 is a schematic view of a structure of an image Gaussian pyramid.
Figure 2:
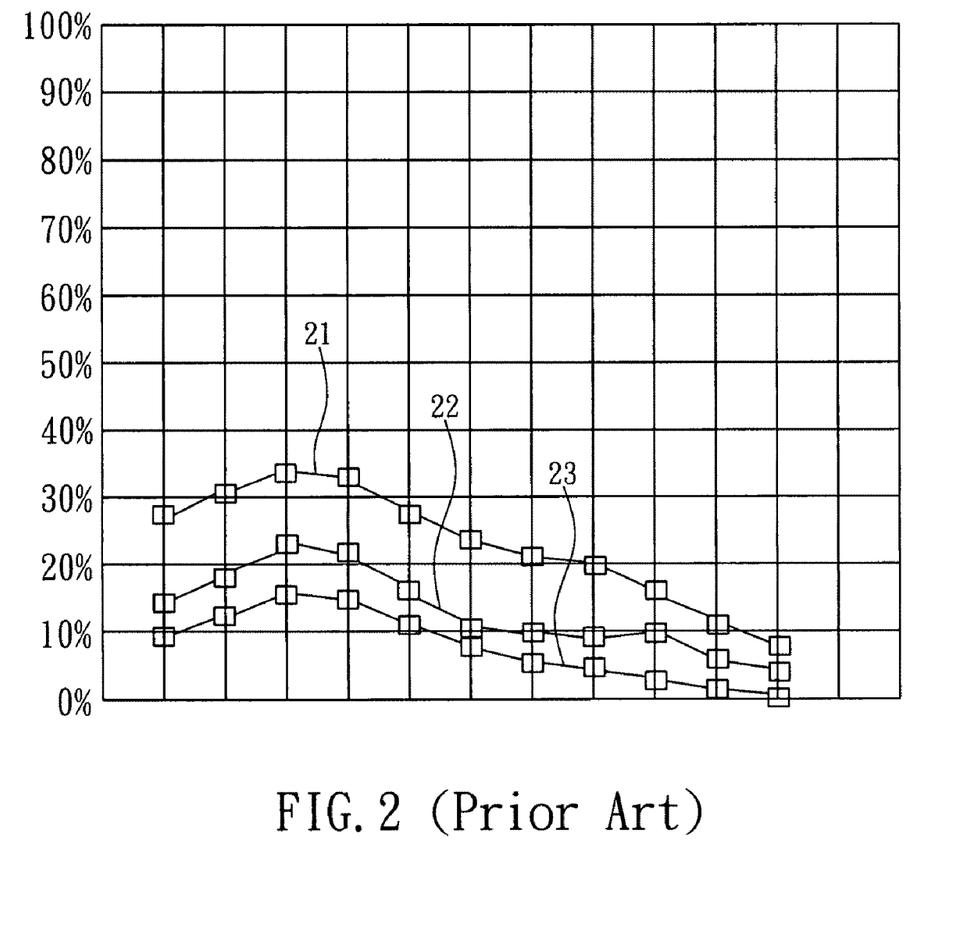
FIG. 2 is a curve diagram showing a variation trend of noise level functions of sub-images in different frequency layers in the structure of the image Gaussian pyramid shown in FIG. 1.

Traditionally, when an imaging device forms a digital image, the digital image inevitably contains noise which is closely correlated with actual imaging conditions and complexity of the image's content. Furthermore, when the imaging device estimates noise of a to-be-processed digital image, there are negative factors (such as when an illumination is too strong or too weak) which may affect the noise estimation, so that it is difficult to distinguish differences between fine textures (such as fine image patterns or details of a meadow, hair, etc.) and high-frequency noise of the to-be-processed digital image. As a result, the precision of noise estimation is low. However, a "multiresolution transformation" can be used to disintegrate an original digital image into a plurality of sub-images in different frequency layers (such as a high frequency, a medium frequency, and a low frequency). For example, FIG. 1 illustrates a frequently used image Gaussian pyramid. When an original digital image 10 having N×N pixels is transformed into a plurality of sub-images 11, 12, 13 in different frequency layers, the sub-image 11 in a high frequency layer has (N/2)×(N/2) pixels, while the pixel numbers of the sub-images 12, 13 in a medium frequency layer and a low frequency layer can be derived analogously. Thus, the sub-images 11, 12, 13 in the different frequency layers show fine details to different degrees, while noise of the original digital image 10 may be shown in different forms in the sub-images 11, 12, 13 in the different frequency layers. For example, the sub-image 13 in the low frequency layer has low-frequency noise which is shown mainly as large particles or masses. Contrarily, the sub-image 11 in the high frequency layer has high-frequency noise which is shown as finer interference points. Meanwhile, when the original digital image 10 is processed by the multiresolution transformation, corresponding positions on the sub-images 11, 12, 13 have continuous and correlated information. Therefore, noise level function values of the respective sub-images 11, 12, 13 at corresponding pixel values should be continuous and correlated with each other. In other words, the noise level function of each of the sub-images 11, 12, 13 in the different frequency levels should be a function that varies continuously with an intensity level of each said sub-image. Furthermore, the noise level function values of each two sub-images 11, 12, 13 in two adjacent frequency layers at corresponding pixel values should have a higher correlation. Therefore, the noise level functions 21 and 22 or 22 and 23 of the sub-images 11, 12, 13 in each two adjacent frequency layers should have similar trends in curve variation, as shown in FIG. 2 by the noise level functions 21, 22 and 23 of the sub-images 11, 12, 13 in different frequency layers.

As described above, the present invention provides a method for estimating noise according to a multiresolution model based on the properties of the multiresolution transformation, in order to solve the problems that an imaging device is inevitably interfered while forming a digital image so that an intensity level of the digital image is distorted while noise shows different variations in different frequency layers. The method according to the present invention utilizes the multiresolution transformation, and through a training process, obtains noise samples generated by the imaging device in different frequency layer s, so as to build up a multiresolutional, a priori model database, allowing the imaging device to estimate noise according to the a priori model database while actually forming a digital image. Therefore, the stability, precision, and completeness of noise estimation under complex background conditions can be effectively enhanced, while the noise level functions can be used to guide subsequent image processing procedures (such as noise removal, image enhancement, feature extraction, etc.), particularly the tune of specific parameters. Because different imaging devices may be provided with different types of imaging sensors (for example, most cell phones use CMOS sensors as image capturers, while most digital cameras use CCD sensors instead), noise generated by the different types (or series) of imaging sensors has different properties. Thus, according to the present invention, when building up the a priori model database, it is necessary to fully consider the noise properties of imaging sensors provided in various imaging devices, and perform a training process on the different types of imaging sensors, in order to accumulate related knowledge about the noise generated by the various imaging devices when digital images are being formed, thereby building up a corresponding a priori model database for providing necessary a priori information, which can be used to estimate noise in a current image, so as to effectively offset the limitations of traditional imaging devices that noise analysis and estimation can be conducted only on a current image.

Figure 3:
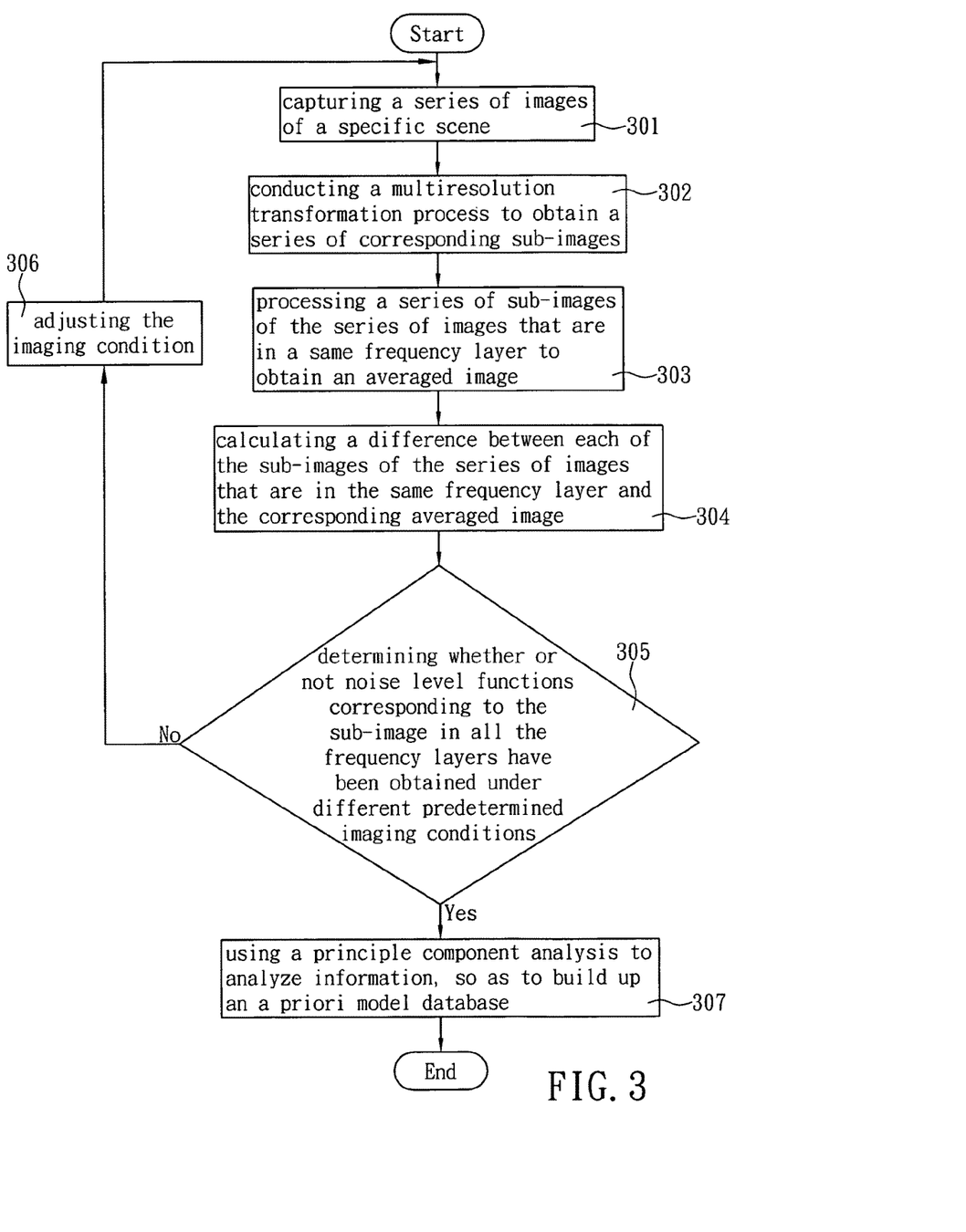
FIG. 3 is a flow chart of building up an a priori model database according to a preferred embodiment of the present invention.
Figure 4:
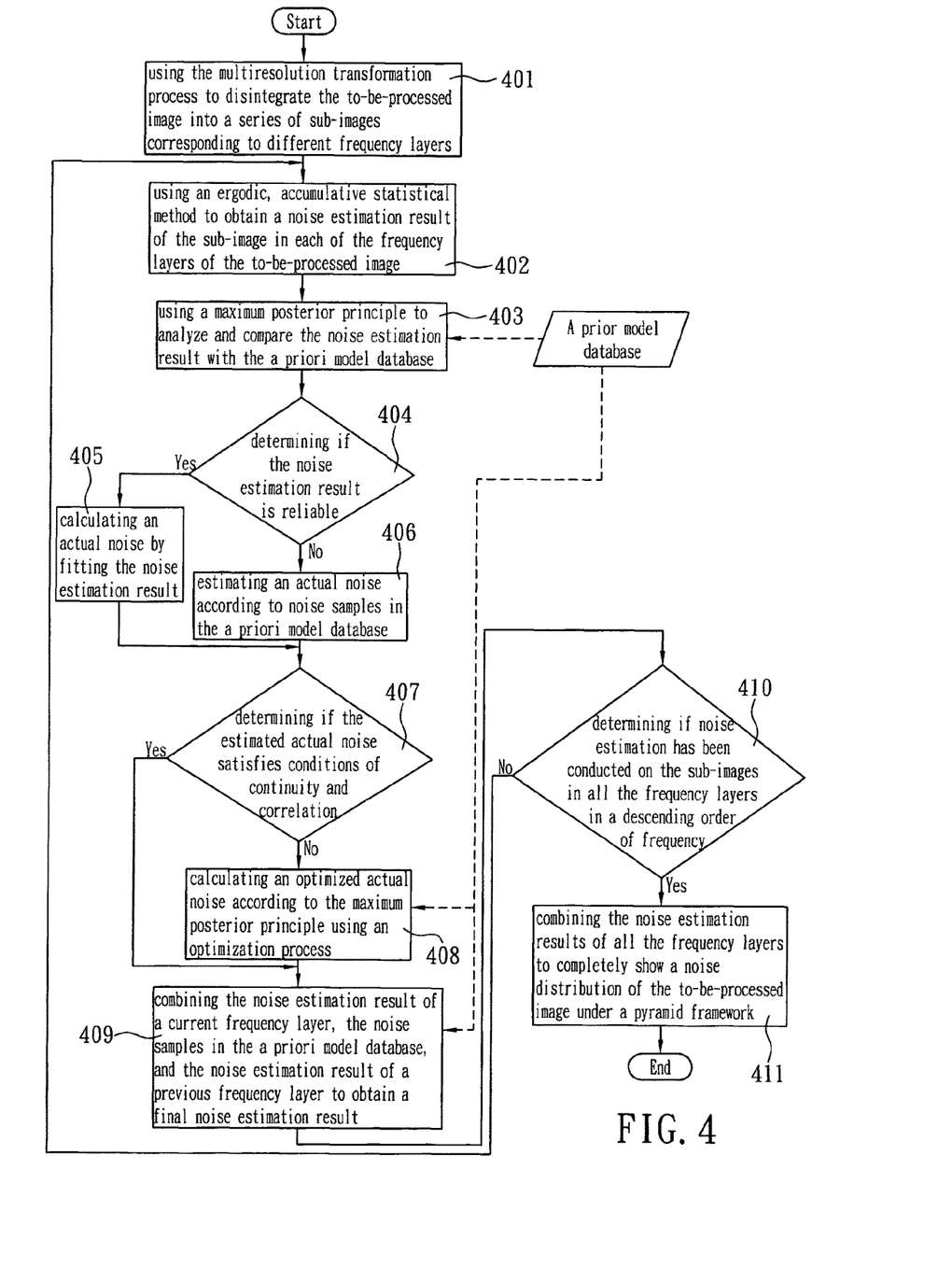
FIG. 4 is a flow chart of estimating noise of a sub-image in each frequency layer of a to-be-processed image when an imaging device captures an image of an actual scene to form the to-be-processed image after the a priori model database is built up, according to the preferred embodiment of the present invention.

Referring now to FIGS. 3 and 4, a method for estimating noise according to a multiresolution model according to a preferred embodiment of the present invention begins with building up an "a priori model database" corresponding to an imaging sensor of an imaging device in the following steps.

In a step 301, when the imaging device forms a digital image, noise generated in the digital image is mainly related to the type of the imaging sensor (CMOS or CCD) in the imaging device and device parameters thereof (such as values of ISO, shutter speed, and aperture). Thus, in the preferred embodiment of the present invention, a set of fixed device parameters of the imaging device is selected. For example, if the imaging device is a digital camera provided with a CCD sensor, device parameters thereof can be set as: ISO800, shutter speed 1/30 s, etc. Then, the imaging device is used to capture a series of images of a specific scene (such as a color palette with intensity gradation, i.e., a color plate with intensity gradation). In the preferred embodiment of the present invention, in order to avoid interference of fine textures and edges in the specific scene, the imaging device preferably captures the images with a defocusing setting. Furthermore, in order to prevent the effects of improper illumination, illumination for the specific scene should be fixed. Preferably, the illumination is a side light and not directly projected to the specific scene from back of the imaging device. Generally, under a particular imaging condition (such as with a normal illumination), the images of the specific scene captured by the imaging device can only show noise of a certain brightness scope. Thus, in the preferred embodiment of the present invention, in order to obtain more complete noise information, the imaging device can also be used to capture images of the specific scene under different imaging conditions (such as under a weaker or stronger illumination), respectively, so that noise obtained from the different imaging conditions can be combined in subsequent processing procedures for generating a more complete noise sample corresponding to each of frequency layers of the image Gaussian pyramid.

In a step 302, the series of captured images are processed by a multiresolution transformation, respectively, so as to obtain a series of corresponding sub-images.

In a step 303, an averaged image is calculated from a series of said sub-images of the series of images which are in a same frequency layer, wherein the averaged image is defined as an actually noiseless image sample in that particular frequency layer.

In a step 304, a difference is computed between each of the sub-images of the series of images which are in the same frequency layer and a corresponding said averaged image, so as to obtain a noise sample of each of the sub-images of the series of images. Then, a brightness variation curve of the differences in relation to the averaged image is calculated using the following equation:

$$\hat{\sigma}_n^2 = \frac{1}{N_n} \sum_{i=1}^{N_n} (I_i - \bar{I})^2 \quad (1)$$

wherein n is an intensity level; $\sigma_n^2$ is a noise variance detected corresponding to that intensity level; $\bar{I}$ is the averaged image; $I_i$ is a sub-image in a series of sub-images which are in a same frequency layer; and $N_n$ is an accumulated pixel number corresponding to that intensity level. Thus, noise level functions of the imaging sensor of the imaging device in different frequency layers under a certain imaging condition are obtained.

A step 305 is to determine whether a series of images of the specific scene have been captured under the different predetermined imaging conditions, and whether each of the images has been processed to obtain the noise level function corresponding to the sub-image in each of the frequency layers. Proceed to a step 307 if yes, and proceed to a step 306 if no.

In a step 306, the imaging condition is adjusted. Then go back to the step 301 and repeat the foregoing steps. When the imaging device has captured a large number of images under different imaging conditions, and the images have been processed with the foregoing multiresolution transformation and calculated accordingly, noise samples for the imaging sensor of the imaging device corresponding to each of the different imaging conditions and frequency layers can be calculated in an accumulative manner.

A step 307 is to apply a principle component analysis (PCA) to analyzing information of the noise samples in each of the frequency layers, so as to extract principle component, which are defined as a group of base vectors of the noise level function in each of the frequency layers. In other words, an actual noise level function τ in each of the frequency layers can be expressed by the following linear equation using the base vector:

$$\tau = \bar{\tau} + \sum_{i=1}^{N} \beta_i w_i \quad (2)$$

wherein $w_i$ is the base vector; and $\bar{\tau}$ is an average vector of the base vector. Thus, the base vector $w_i$, the average value $\bar{\tau}$ thereof, and the eigen value corresponding to the base vector $w_i$ constitute data in the a priori model database of the present invention. Since the a priori model database only needs a small storage capacity, the vectors can be stored in a lookup table. Thus, the vectors stored in the lookup table can be speedily found when the a priori model database is put to actual use in the subsequent processing procedures.

In the preferred embodiment of the present invention, after the digital image formed by the imaging device under an actual imaging condition is processed with the multiresolution transformation, the noise level functions for the respective frequency layers are distributed in the mathematical space based on the part of the a priori model, so that vectors for each of the frequency layers stored in the a priori model database are highly correlated with the estimation of a noise level function of a sub-image in each of the different frequency layers of any digital image captured by the imaging device.

In the preferred embodiment of the present invention, after the a priori model database is built up and installed in the imaging device, the imaging device captures an image of an actual scene to form a digital image thereof, and processes in an online manner a to-be-processed image captured by the imaging device, so as to obtain a noise estimation result of a sub-image in each of the frequency layers of the to-be-processed image. Referring to FIG. 4, the online process is carried out in the following steps.

In a step 401, the multiresolution transformation, such as the wavelet transform or the image pyramid, is applied to disintegrate the to-be-processed image into a series of sub-images corresponding to the different frequency layers.

In a step 402, the sub-images in all the frequency layers are calculated with an accumulative statistical method, so as to obtain noise characteristics for the sub-image in each of the frequency layers of the to-be-processed image. In the preferred embodiment of the present invention, when calculation is performed according to the intensity level of the sub-image in each of the frequency layers, a variance or standard deviation that occurs the most frequently is selected and defined as noise characteristics (i.e., variance or standard deviation) of the sub-image in each said frequency layer. Thus, an initial input (i.e., a result) of noise estimation of the sub-image in each of the frequency layers of the to-be-processed image can be defined by the following equation:

$$\{I_n, \hat{\sigma}_n\}, n=0, \ldots, 255 \quad (3)$$

wherein $I_n$ is the intensity level; and $\sigma_n$ is the noise variance corresponding to that intensity level. Because a method for calculating the noise characteristics of the sub-image in each of the frequency layers of the to-be-processed image has been disclosed in U.S. patent application Ser. No. 11/783,456 and is not the subject matter of the present invention, a detail description of the method will be omitted herein.

In a step 403, the noise estimation result is compared with the a priori model database and analyzed based on maximum a posterior (MAP) principle.

In a step 404, because an estimation process of the MAP principle comprises determining whether the initial input is reliable or which part of the initial input is reliable, an estimation result of the MAP principle will be an optimized result generated from an interaction of the initial input, the a priori model database, and an optimization process. In other words, if the initial input is reliable and affected by little interference, the estimation result of the MAP principle will basically output a result similar to the initial input, while the a priori model database automatically plays a minor role. If the initial input is affected by more interference and a greater part of the initial input is unreliable, the a priori model database will automatically provide a stronger guiding function or correcting function during the estimation process of the MAP principle, in order to obtain a result that is relatively matched with an actual condition. In the preferred embodiment of the present invention, the MAP principle determines whether the noise estimation result is reliable. If the noise estimation result is determined to be reliable, the noise estimation result itself plays a major role, and the process goes on to a step 405. On the other hand, if the noise estimation result is determined to have defects or unreliable intensity levels, the noise samples in the a priori model database will play the major role, and the process goes on to a step 406.

In a step 405, an actual noise is calculated by fitting the noise estimation result. Then proceed to a step 407.

In a step 406, an actual noise is estimated according to the a priori model database.

A step 407 is to determine whether the estimated actual noise satisfies the following conditions. Then go on to a step 409 if yes, and go on a step 408 if no:

(1) having a smooth variation without violent undulation, and showing apparent continuity; and (2) having a certain correlation between the actual noise in each of the frequency layers, while the actual noise in each two adjacent said frequency layers satisfy numerically a similar linear relationship, i.e., $\tau_{i+1} = K\tau_i$.

In a step 408, an optimized actual noise is calculated according to the MAP principle using the following optimization process, so as to solve a problem that the noise sample $\tau$ and the noise estimation result $x_l$ do not satisfy the foregoing condition:

(1) the optimized actual noise in the highest frequency layer is calculated in this optimization process by the following equation:

$$\begin{cases} \tilde{x}_l = \arg\min \left\{ \alpha \cdot \sum_{n=1}^{256} \left[ -\log \Phi\left( \frac{\sqrt{k_n}}{\hat{\sigma}_n}(\hat{\sigma}_n - e_n^T x_l - \tau_n) \right) + \beta \cdot \frac{(e_n^T x_l + \tau_n - \hat{\sigma}_n)^2}{2s^2} \right] + \gamma \cdot x_l^T \Lambda^{-1} x_l \right\} \\ \text{s.t.} \\ \bar{\tau} + \sum_{i=1}^{N} (x_l)_i w_i \geq 0 \end{cases}$$

wherein $\tau$ is a noise level function to be estimated; N is a selected number of base vectors (generally 8); $\Phi(\cdot)$ is a cumulative distribution function of standard normal distribution; $e_n^T$ is obtained from a selected basic structure; and $\alpha, \beta, \gamma$ are tuned parameters; and (2) the optimized actual noise in the other frequency layers are calculated by the following equation:

$$x_l = [\beta_1, \beta_2, \ldots \beta_N, k]^T$$

$$\begin{cases} \tilde{x}_l = \arg\min \left\{ \alpha \cdot \sum_{n=1}^{256} \left[ -\log \Phi\left( \frac{\sqrt{k_n}}{\hat{\sigma}_n}(\hat{\sigma}_n - e_n^T x_{l|k} - \tau_n) \right) + \beta \cdot \frac{(e_n^T x_{l|k} + \tau_n - \hat{\sigma}_n)^2}{2s^2} \right] + \gamma \cdot x_{l|k}^T \Lambda^{-1} x_{l|k} + \sum_{n=1}^{256} \left( \tau_n - \frac{(\tau_{up})_n}{k} \right)^2 \bigg/ (2\sigma_{level}^2) \right\} \\ \text{s.t.} \\ \bar{\tau} + \sum_{i=1}^{N} (x_{l|k})_i w_i \geq 0, \quad 0.5 \leq k \leq 5 \end{cases}$$

wherein $\tau_{up}$ is a noise level function of a higher frequency layer; k describes a linear relationship between a noise level function of a previous frequency layer and a noise level function of a current frequency layer; $x_{l|k}$ is information part divided by k; and $\sigma_{level}$ describes a degree of correlation between noise level functions of adjacent frequency layers.

In a step 409, when estimating noise of the sub-image in each of the frequency layers, an optimized noise estimation result is calculated by combining the noise estimation result of the current frequency layer, the a priori model database, and the noise estimation result of the previous frequency layer, wherein the optimized noise estimation result is defined as a final noise estimation result of the current frequency layer.

A step 410 is to determine whether or not the noise of the sub-images in all the frequency layers have been estimated in a descending order of frequency. If yes, go on to a step 411; if no, go back to the step 402 to estimate noise of a next frequency layer.

In a step 411, the noise estimation results of all the frequency layers are combined, so as to completely show the noise distribution of the to-be-processed image under the framework of the image pyramid.

Figure 5:
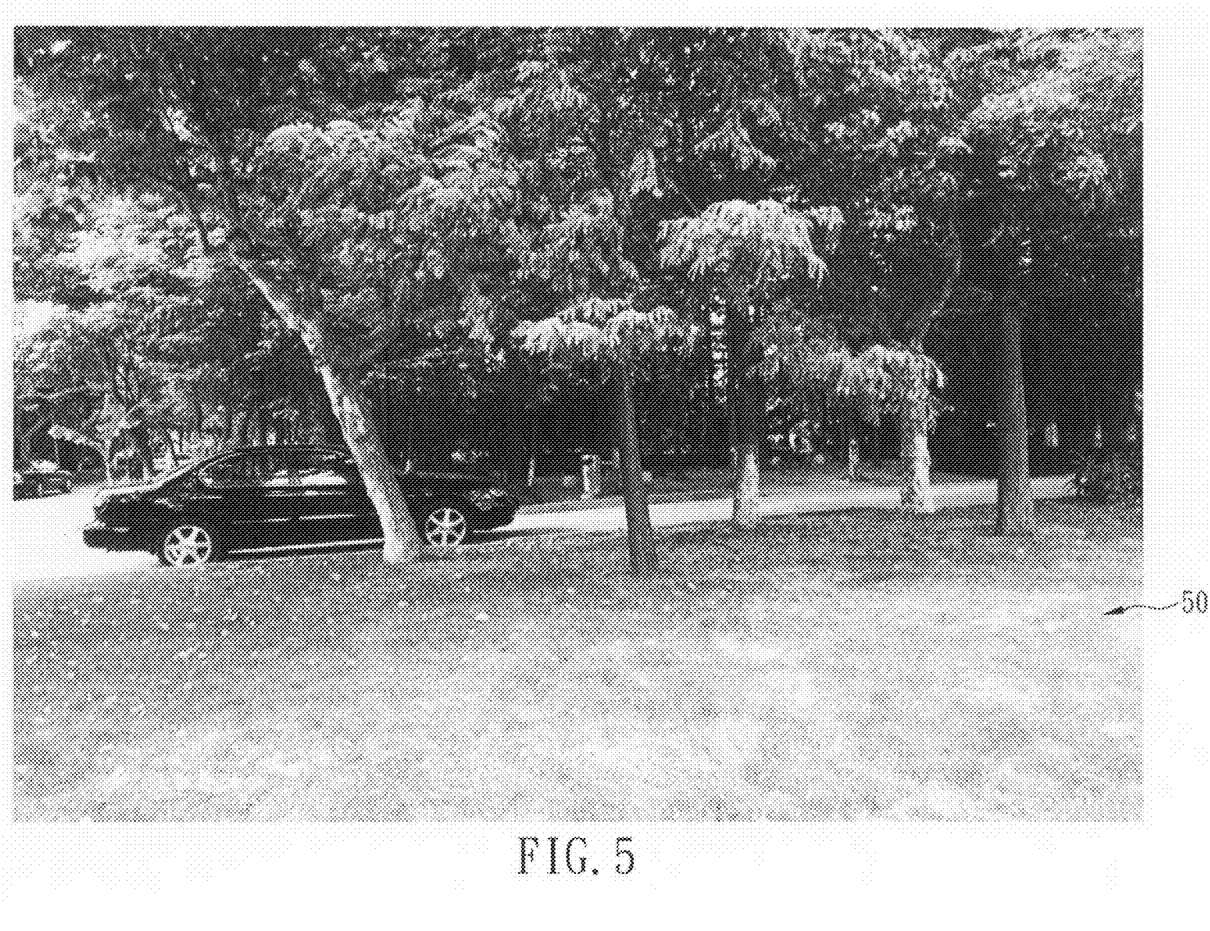
FIG. 5 illustrates a scene comprising a meadow and tree leaves, wherein a strong sunshine and a shadow provide a sharp contrast.
Figure 6:
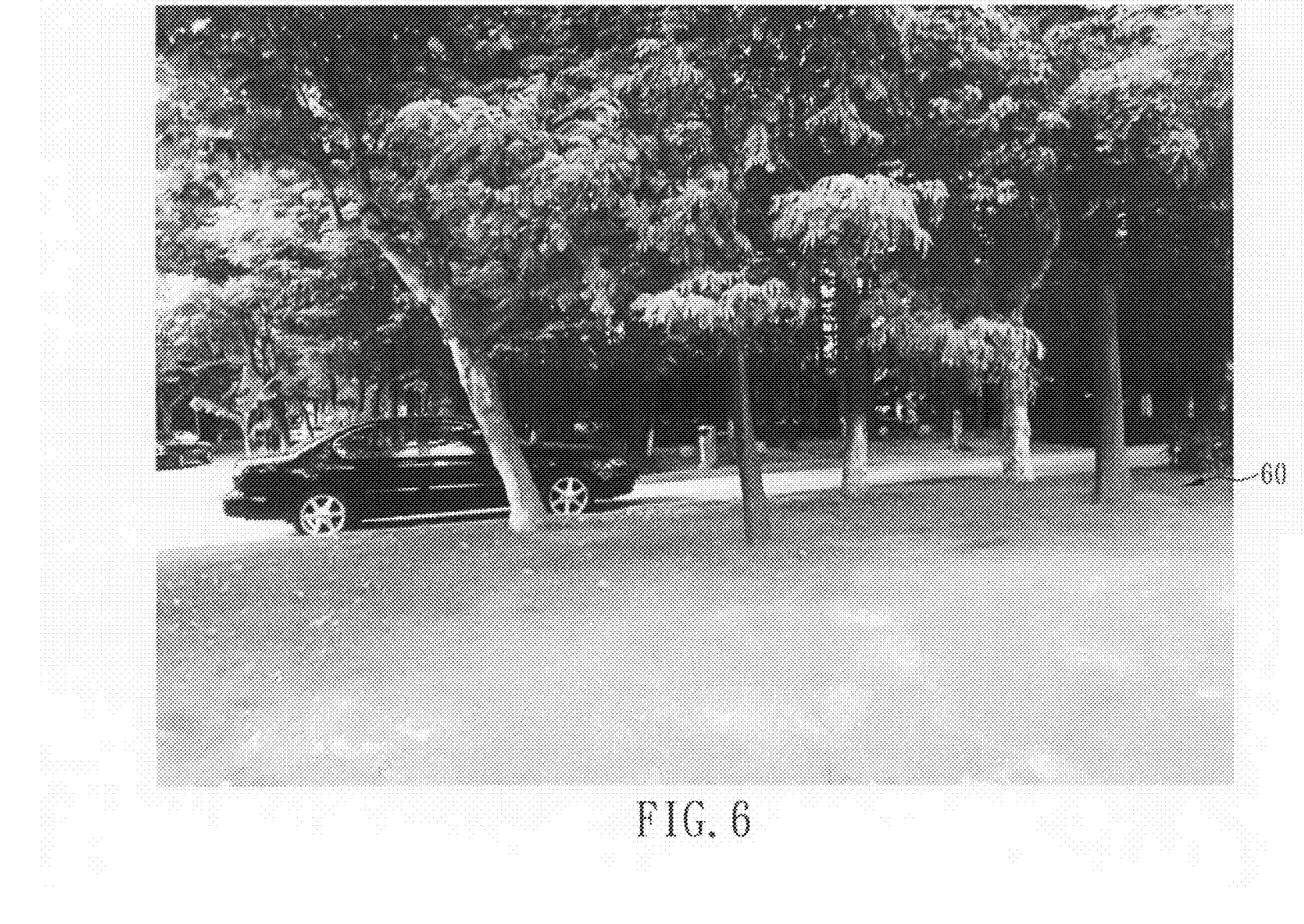
FIG. 6 is a noise-containing digital image corresponding to the scene of FIG. 5 formed by a traditional imaging device.
Figure 7:
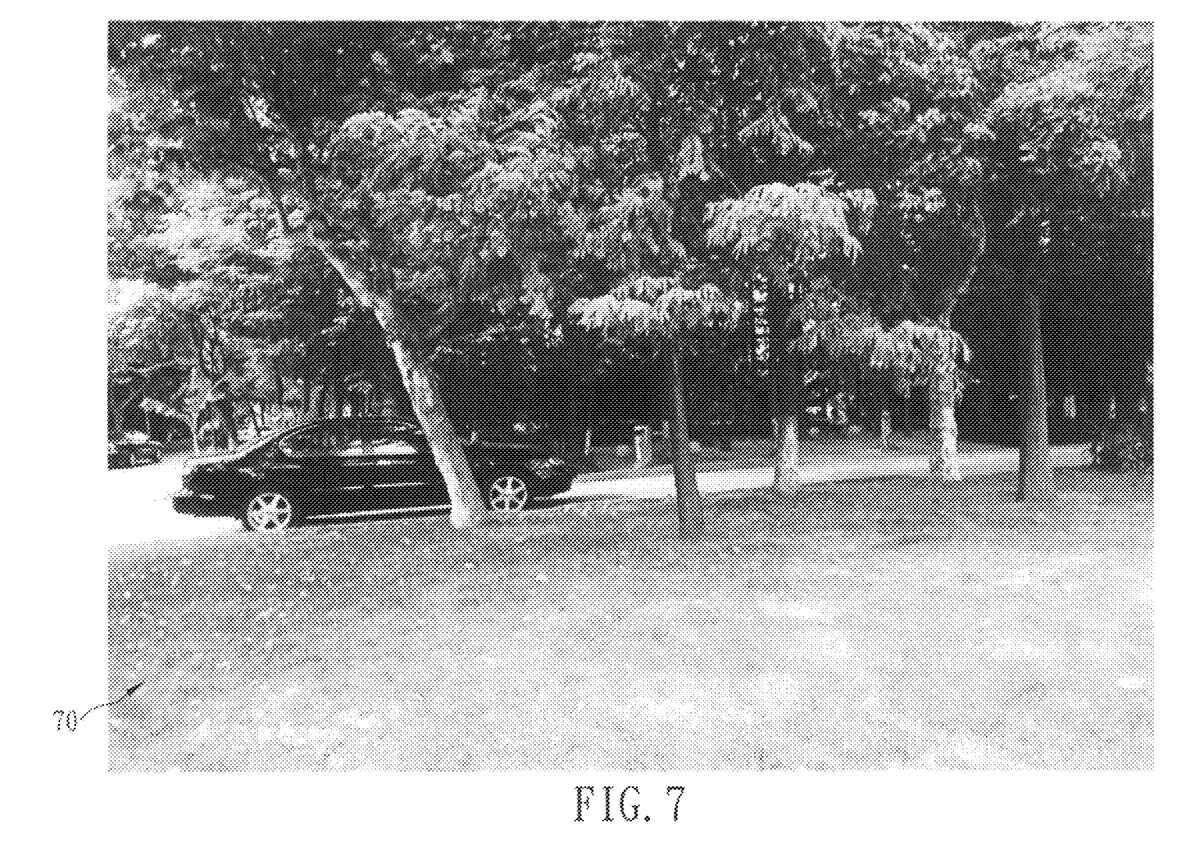
FIG. 7 is a clear and noiseless digital image corresponding to the scene of FIG. 5 formed by an imaging device using the method of the present invention.

The aforementioned method for estimating noise was actually applied to an imaging device to compare with a traditional imaging device using the traditional method for estimating noise. Referring now to FIG. 5, a scene 50 is shown to have a meadow and tree leaves, wherein a strong sunshine and a shadow provide a sharp contrast, so that a to-be-processed image of the scene 50 is a digital image with noise. Since it is difficult for the traditional imaging device to distinguish high-frequency noise from image details of the meadow, the traditional imaging device fails to estimate noise precisely, so that device parameters thereof cannot be precisely adjusted accordingly, and therefore noise is not precisely removed from the to-be-processed image. As a result, referring to FIG. 6, the digital image formed by the traditional imaging device has lost the image details of the meadow and tree leaves and become a digital image 60 containing blurry image details. Contrarily, when the imaging device using the method of the present invention is used to capture the same scene 50 shown in FIG. 5, the method of the present invention allows precise noise estimation, so that device parameters of the imaging device using the method of the present invention are precisely adjusted, and noise is precisely removed from the to-be-processed image. As a result, referring to FIG. 7, the digital image formed by the imaging device using the method of the present invention is a digital image 70 having clear image details but no noise, wherein the noise has been removed while the image details of the meadow and tree leaves are completely maintained.

It should be noted that the foregoing description is only one of preferred embodiments of the present invention, and it is understood that the present invention is not limited to the preferred embodiment disclosed herein. In an alternative preferred embodiment of the present invention, after building up the a priori model database, the a priori model database is installed into an electronic device (such as a notebook computer). When the electronic device receives a digital image of an actual scene captured by the imaging device, the electronic device can process the digital image captured by the imaging device according to the steps shown in FIG. 4 in an off-line manner, so as to obtain a noise estimation result of a sub-image in each of the frequency layers of the digital image.

As described above, the method of the present invention can execute a training process on various types of imaging sensors, in order to accumulate related knowledge about the noise generated by the various imaging devices when digital images are actually being formed. Thus, the method of the present invention can build up a corresponding a priori model database to provide necessary a priori information for subsequent image processing procedures, so as to effectively offset limitations of the traditional imaging device that noise analysis can be conducted only on content of a current image. Therefore, the method of the present invention can provide higher adaptability and intelligence in noise estimation. Meanwhile, the method of the present invention can precisely estimate noise in complex image content, so as to effectively enhance the stability, precision, and completeness of noise estimation under complex background conditions, for the purpose of adjusting various device parameters in subsequent image processing procedures, in order to form a clearer digital image.

The present invention has been described with the preferred embodiment thereof and it is understood that the embodiment is not intended to limit the scope of the present invention. Moreover, as the content disclosed herein should be readily understood and can be implemented by a person skilled in the art, all equivalent changes or modifications which do not depart from the spirit of the present invention are encompassed by the appended claims.

What is claimed is:

1. A method for estimating noise according to a multiresolution model, wherein the method is applied to an imaging device and comprises steps of:

using an imaging sensor of the imaging device to capture a series of images of a specific scene under different imaging conditions;

processing each of the images with a multiresolution transformation, so as to obtain a series of sub-images corresponding to different frequency layers;

processing a series of said sub-images of the series of images that are in a same frequency layer, in order to generate an averaged image, which is defined as an actually noiseless sub-image sample in that particular frequency layer;

determining a difference between each of the sub-images in the same frequency layer and the averaged image corresponding to that particular frequency layer, and calculating said differences and the averaged image to obtain a noise level function of the imaging sensor in each of the different frequency layers under the different imaging conditions; and defining the noise level functions of the imaging sensor in the different frequency layers under the different imaging conditions as noise samples for building up an a priori model database.

2. The method of claim 1, wherein when the a priori model database has been built up and the imaging device captures an image of an actual scene to form a to-be-processed image, the method further comprises steps of:

processing the to-be-processed image with the multiresolution transformation, so as to calculate noise characteristics corresponding to an intensity level of the sub-image in each of the different frequency layers of the to-be-processed image;

estimating and obtaining an optimized noise estimation result of the sub-image in each of the different frequency layers of the to-be-processed image according to the noise characteristics, the a priori model database, and a noise estimation result of a previous said frequency layer; and combining the noise estimation optimized results of all the sub-images in the different frequency layers, so as to obtain a noise distribution of the to-be-processed image under a pyramid framework.

3. The method of claim 2, wherein the specific scene is a color palette having an intensity level.

4. The method of claim 3, wherein a principle component analysis is used to analyze the differences and extract a group of principle components which are defined as base vectors of the noise level function in each of the frequency layers, so that an actual noise level function $\tau$ in each of the frequency layers can be expressed by a following linear equation using the base vectors:

$$\tau = \overline{\tau} + \sum_{i=1}^{N} \beta_i w_i$$

wherein $w_i$ is the base vector, and $\overline{\tau}$ is an average value of the base vector, so that the base vector $w_i$, the average value $\overline{\tau}$ thereof, and the eigen value corresponding to the base vector $w_i$ constitute data in the a priori model database.

5. The method of claim 4, wherein the values in the a priori model database are stored in a lookup table.

6. The method of claim 5, further comprising a step of:
calculating the sub-image in each of the frequency layers with an accumulative statistical method, so as to obtain the noise characteristics of the sub-image in each of the frequency layers of the to-be-processed image.

7. The method of claim 6, wherein the accumulative statistical method comprises a step of:
when calculation is performed according to the intensity level of the sub-image in each of the frequency layers, selecting a variance or standard deviation the occurs the most frequently as the noise characteristics of the sub-image in each of the frequency layers, wherein the noise estimation result of of the sub-image in each of the frequency layers of the to-be-processed image can be defined by an equation:

$$\{I_n, \hat{\sigma}_n\}, n = 0, \ldots, 255$$

wherein $I_n$ is an intensity level, and $\sigma_n$ is the noise variance corresponding to the intensity level.

8. The method of claim 7, further comprising a step of:
analyzing and comparing the noise estimation result with the a priori model database with maximum a posterior principle.

9. The method of claim 8, further comprising step of:
determining whether the noise estimation result is reliable.

10. The method of claim 9, further comprising step of:
calculating an actual noise by fitting the noise estimation result, if the noise estimation result is determined to be reliable.

11. The method of claim 9, further comprising a step of:
estimating an actual noise according to the noise samples in the a priori model database, if the noise estimation result is determined to have defects or unreliable intensity levels.

12. The method of claim 9, further comprising a step of:
determining whether or not the estimated actual noise satisfies following conditions of continuity and correlation:
having a smooth variation without violent undulation, and showing apparent continuity; and
having a certain correlation between the actual noise in each of the frequency layers, while the actual noise in each two adjacent said frequency layers satisfy numerically a similar linear relationship.

13. The method of claim 12, further comprising a step of:
calculating an optimized actual noise according to the maximum a posterior principle using an optimization process, if the estimated actual noise is determined not to satisfy the conditions of continuity and correlation.

14. The method of claim 13, further comprising a step of:
determining whether or not noise estimation has been conducted on the sub-images in all the frequency layers in a descending order of frequency.

15. The method of claim 14, further comprising a step of:
combining the noise estimation results of all the frequency layers only when it is determined that noise estimation has been conducted on the sub-images in all the frequency layers in the descending order of frequency, so as to completely show the noise distribution of the to-be-processed image under the pyramid framework.

* * * * *